US010883254B2

(12) United States Patent
Bolz et al.

(10) Patent No.: US 10,883,254 B2
(45) Date of Patent: Jan. 5, 2021

(54) OPERATING DEVICE FOR A WORKING MACHINE

(71) Applicant: LIEBHERR-HYDRAULIKBAGGER GMBH, Kirchdorf/Iller (DE)

(72) Inventors: Gerhard Bolz, Kirchdorf an der Iller (DE); Florian Mang, Memmingen (DE); Dieter Ansorge, Rot an der Tot (DE)

(73) Assignee: Liebherr-Hydraulikbagger GmbH, Kirchdorf/Iller (DE)

( * ) Notice: Subject to any disclaimer, the term of this patent is extended or adjusted under 35 U.S.C. 154(b) by 0 days.

(21) Appl. No.: 16/044,847

(22) Filed: Jul. 25, 2018

(65) Prior Publication Data

US 2019/0136489 A1    May 9, 2019

(30) Foreign Application Priority Data

Jul. 25, 2017  (DE) .......................... 10 2017 116 830

(51) Int. Cl.
| | |
|---|---|
| *E02F 9/20* | (2006.01) |
| *E02F 9/26* | (2006.01) |
| *G08C 17/00* | (2006.01) |
| *G06F 3/01* | (2006.01) |
| *G05G 9/04* | (2006.01) |
| *G05G 9/047* | (2006.01) |

(52) U.S. Cl.
CPC ............ *E02F 9/2004* (2013.01); *E02F 9/205* (2013.01); *E02F 9/26* (2013.01); *G05G 9/04* (2013.01); *G06F 3/014* (2013.01); *G08C 17/00* (2013.01); *G05G 2009/04774* (2013.01); *G08C 2201/32* (2013.01)

(58) Field of Classification Search
CPC .......... G06F 3/014; G06F 3/011; G06F 3/017; G06F 3/0304; G06F 3/0346; G06F 3/015; G06F 3/016; G06F 3/0233; G06F 3/0238; G06F 3/038; G06F 3/04886; B25J 13/02; B25J 13/085; B25J 15/0009; B25J 3/04; E02F 9/2008; E02F 9/205; G08C 17/00; G08C 2201/32
See application file for complete search history.

(56) References Cited

U.S. PATENT DOCUMENTS

| | | | | |
|---|---|---|---|---|
| 4,972,074 | A * | 11/1990 | Wright ................... | G02B 6/264 250/221 |
| 5,323,174 | A * | 6/1994 | Klapman ................ | G06F 3/0338 345/156 |
| 7,862,522 | B1 * | 1/2011 | Barclay ................ | A61B 5/6806 600/595 |

(Continued)

FOREIGN PATENT DOCUMENTS

| | | |
|---|---|---|
| DE | 19802983 A1 | 7/1999 |
| DE | 100 43 179 A1 | 3/2002 |

(Continued)

*Primary Examiner* — Yong Hang Jiang
(74) *Attorney, Agent, or Firm* — Dilworth & Barrese, LLP (57) ABSTRACT

The invention relates to an operating unit for a working machine with at least one boom, wherein the operating device is configured to generate control signals for actuating the working machine in dependence on at least one joint position of a hand of an operator, and wherein the operating device comprises at least one operating unit.

4 Claims, 8 Drawing Sheets

(56) References Cited

U.S. PATENT DOCUMENTS

| | | | |
|---|---|---|---|
| 2006/0248478 A1* | 11/2006 | Liau | G06F 3/014 715/863 |
| 2009/0143142 A1* | 6/2009 | Marcus | G06F 1/1626 463/37 |
| 2011/0257816 A1* | 10/2011 | Song | G08C 17/00 701/2 |
| 2012/0142416 A1* | 6/2012 | Joutras | A63B 24/0006 463/36 |
| 2012/0209560 A1 | 8/2012 | Young | |
| 2013/0079905 A1* | 3/2013 | Saen | B25J 9/1671 700/83 |
| 2013/0278500 A1 | 10/2013 | Kawasaki et al. | |
| 2013/0278501 A1* | 10/2013 | Bulzacki | G06F 3/017 345/157 |
| 2014/0098018 A1 | 4/2014 | Kim et al. | |
| 2014/0216192 A1* | 8/2014 | Dize | G05G 9/04788 74/471 XY |
| 2017/0315620 A1 | 11/2017 | Johri | |

FOREIGN PATENT DOCUMENTS

| | | |
|---|---|---|
| JP | 2005-212957 A | 8/2005 |
| JP | 2006-028953 A | 2/2006 |
| KR | 10-2013-0076101 A | 7/2013 |

\* cited by examiner

OPERATING DEVICE FOR A WORKING MACHINE

BACKGROUND OF THE INVENTION

This invention relates to an operating device for a working machine with at least one boom, wherein the operating device is configured to generate control signals for actuating the working machine in dependence on at least one joint position of a hand of an operator, and wherein the operating device comprises at least one operating unit.

In construction machines or working machines, such as for example hydraulic excavators, it is known according to the prior art to operate the same from a driver's cabin provided thereon. The conventional operation of a work equipment of the working machine usually is effected via manual control devices which actuate control valves by hydraulic and/or electrical signals in order to control an oil flow to hydraulic cylinders. The same also applies for rotary movements of an uppercarriage of the working machine. The manual control devices generally can be mounted in a support console within the driver's cabin to the left and right of the drivers seat. In the context of the present invention reference is made to working machines which in the sense of the invention comprise construction machines, but also further machines such as material handling machines or any other handling machines.

In the control, an oil quantity is passed to corresponding hydraulic cylinders of the working machine corresponding to the paths covered by the manual control devices or corresponding to the deflection of corresponding levers of the manual control devices.

The individual partial movements of the work equipment or the working machine must be adjusted by the machine operator by a targeted deflection of the control levers in order to achieve a homogeneous working movement of the working tool. The intuitive operation of the working machine is not easily possible.

From the prior art, control units away from the machine or remote control units furthermore are also known, by means of which the function of the above-described conventional operation can be transmitted to the working machine via a radio signal and thus can be applied to or carried out on an external operating unit. It is well-known that such radio remote control units are configured as "sales trays" which a machine operator can wear around his neck and/or which a machine operator holds in front of his body for operating the machine.

In the operation known from the prior art it is disadvantageous that the complex working cycle of the working machine requires a lot of practice of the machine operator when operating the functions of the working machine or the excavator functions via two manual control devices. This in turn results in a relatively long learning time of the machine operator.

SUMMARY OF THE INVENTION

Against this background it is the object of the invention to provide an improved operating device for operating a working machine. With the operating device according to the invention it will become possible to also allow untrained machine operators with only short training phases to safely operate the working machine. Correspondingly, a significant reduction of the training time of the machine operator can be achieved according to the invention.

According to the invention, this object is solved by an operating device with the features herein. Advantageous aspects are also subject-matter herein.

Accordingly, there is provided an operating device for a working machine with at least one boom, wherein the operating device is configured to generate control signals for actuating the working machine in dependence on at least one joint position of at least one hand of an operator, wherein the operating device comprises at least one operating unit.

What can be meant by the at least one joint position of the hand for example can be at least one angular position an arbitrary joint of a human hand, such as for example a finger joint or the wrist.

According to the invention it is provided that the operating unit is equipped to detect the position of the wrist, of at least one metacarpophalangeal joint, at least one proximal interphalangeal joint, at least one distal interphalangeal joint, the thumb saddle joint, the thumb base joint and/or the thumb end joint of the at least one hand. What can be meant by the position of the respective joint in particular is the angular position of the respective joint or a parameter dependent thereon.

The operating unit can be fixed on the hand of the operator, wherein in particular buckles can be provided by means of which the operating unit can be fixed on the hand and/or on the forearm of the operator.

The operating unit for example can be coupled to the working machine via a wireless interface for transmitting the control signals. Hence, for operations in a dangerous environment the operation of the working machine also is possible from a safe location and in particular at distance from the working machine.

Advantageously, the operating unit provides for an intuitive operation of the working machine by the machine operator, wherein in particular homogeneous working movements of the equipment and of the uppercarriage of the working machine can be carried out easily.

Complex working movements of the working machine or of the work equipment and of the attachment tool of the working machine can be controlled by manifest movements of the machine operator by means of the operating device according to the invention. Thus, by using novel operating elements, the invention provides for an intuitive operation of the work functions for example of a hydraulic excavator or another working machine.

The operating unit can be ergonomically designed such that it can be fixed on a hand of the machine operator.

Thus, the invention also provides for utilizing or controlling autonomous working machines in which no drivers workplaces are provided on the working machines and which thus are suitable for operations in particularly endangered work areas. Furthermore, the acquisition and operating costs of a working machine can be reduced by means of the operating device according to the invention.

The operating device can be an external working machine remote control unit or excavator remote control unit, in which the working movement of the work equipment and of an attachment tool as well as the rotary movement of the uppercarriage and possibly the crawler movements of a crawler drive or other drive movements of the working machine can be controlled by means of the operating device. This applies in particular for the digging movements of the working machine, which according to the invention can be controlled intuitively via digging movements of the human hand.

In a particularly preferred embodiment it is conceivable that the operating device comprises exactly two operating units, wherein by means of a first operating unit at least one joint position of the left hand and/or by means of the second operating unit at least one joint position of the right hand of the operator can be detected. The operating unit or the operating units can of course also be configured to be utilized with an arbitrary hand of the machine operator.

It is conceivable that with one hand of the operator or of the machine operator working movements of an excavator equipment or another working machine equipment are carried out. The working movement can comprise the pivoting of a boom and/or a dipper arm. Alternatively or in addition, an operating unit associated with the other hand can be utilized to control the working movement of a working tool.

Of course, a reverse or different allocation of the operating units also is conceivable. The operating units can each be configured for the bilateral operation or for the bilateral utilization by the left or the right hand of a machine operator.

In another preferred embodiment it is conceivable that the operating device is configured to generate at least one control signal for actuating at least one actuator of the working machine on the basis of at least one of the detected positions.

In a particularly preferred embodiment it can be provided that the at least one actuator is a first actuator which is equipped to pivot a first portion of the boom of the working machine relative to an uppercarriage of the working machine, wherein in particular the first actuator can be actuated in dependence on the position of the wrist. The first actuator for example can pivot a swivel arm or the entire boom of the working machine relative to its uppercarriage.

In the present case, the term of the first actuator is not to be understood in a limiting sense. A single or sole actuator or a plurality of actuators also can be referred to as the first actuator of the working machine.

In another preferred embodiment it is conceivable that the at least one actuator is a second actuator which is equipped to pivot a second portion of the boom of the working machine relative to another portion of the boom, wherein in particular the second actuator can be actuated in dependence on the position of at least one metacarpophalangeal joint.

Furthermore, an embodiment is conceivable in which the at least one actuator is a third actuator which is equipped to pivot a third portion of the boom of the working machine relative to another portion of the boom, wherein in particular the third actuator can be actuated in dependence on the position of at least one proximal interphalangeal joint and/or distal interphalangeal joint. The portions of the boom can be dipper arms or other components of the boom.

In another preferred embodiment it is conceivable that the at least one actuator is a fourth actuator which is equipped to adjust a working tool and/or a digging tool of the working machine, wherein in particular the fourth actuator can be actuated in dependence on the position of exactly two proximal interphalangeal joints and/or distal interphalangeal joints.

In another preferred embodiment it can be provided that the at least one actuator is a fifth actuator which is equipped to pivot a working tool and/or a digging tool of the working machine relative to a portion of the boom, wherein in particular the fifth actuator can be actuated in dependence on the position of the wrist and/or at least one metacarpophalangeal joint.

Alternatively or in addition, the individual actuators can be actuatable in dependence on the positions of several joints. The working tool for example can be a digging tray or an excavator bucket.

In one embodiment of the invention with exactly two operating units it can be provided that with one of the operating units at least one of the three actuators associated with the boom according to claims 4-6 is associated, while with the other operating unit at least one of the actuators associated with the working tool according to any of claims 7-8 is associated. What is also conceivable, however, is any other allocation of the actuators of the operating units which the skilled person regards as expedient.

In another preferred embodiment it is conceivable that the at least one operating unit comprises a display, in particular a touch screen.

Via the display or the touch screen information on operating conditions of the working machine and/or order data can be indicated to the machine operator. Furthermore, additional control functions can be executed via the touch screen.

According to the invention, the machine operator can be relieved by a computer-aided inverse control. As the working machines can be used in a networked construction site environment, signals and information can be transmitted bidirectionally or polydirectionally between the working machine, the operating device, the environment of the working machine and possibly further devices by means of the operating unit and in particular by means of the touch screen.

The invention furthermore is also directed to a working machine, in particular to a hydraulic excavator, with at least one operating device, wherein the operating device is coupled to a control unit of the working machine via an in particular wireless interface. The control unit can be an on-board computer of the working machine or any other regulation/control unit of the working machine.

BRIEF DESCRIPTION OF THE DRAWINGS

Further details and advantages of the invention will be explained in detail with reference to the embodiment shown in the Figures by way of example. In the drawings.

DESCRIPTION OF THE PREFERRED EMBODIMENTS

Figure 1:
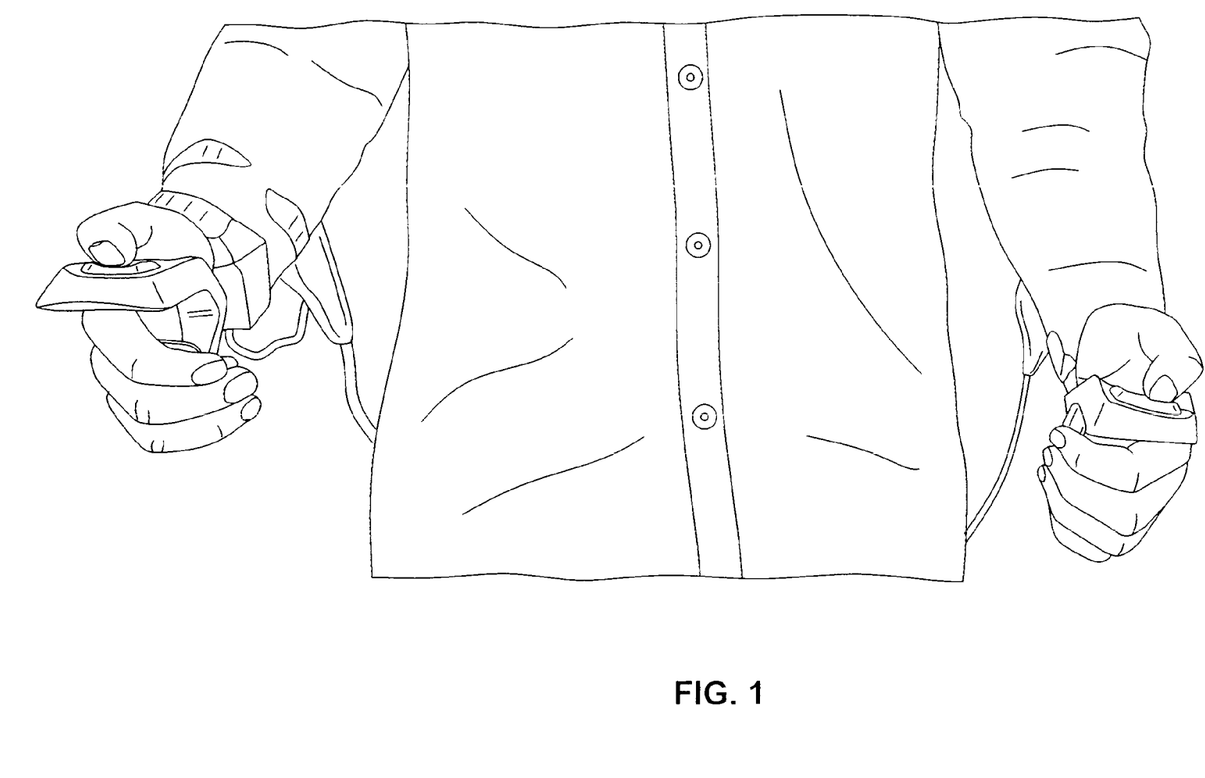
FIG. 1: shows a partial view of a machine operator with two operating units of an operating device according to the invention.

FIG. 1 shows a front view of a machine operator with an operating device comprising two operating units. By means of the operating device it is possible to generate control signals for actuating a working machine or construction machine. The control signals can depend on at least one joint position of the hands or the fingers of the machine operator. The operating unit associated with the right hand of the machine operator for example can detect the position of the wrist and the position of the metacarpophalangeal joints of the right hand of the machine operator and use these positions to generate control signals for actuating the construction machine. For example, a boom such as an excavator arm can be actuated corresponding to the position of the right hand and/or its fingers. For detecting the position of the hand, mechanical movements of the operating unit can be digitized by means of sensors such as for example by means of a potentiometer and be used as output values for the generation of control signals.

Figure 2:
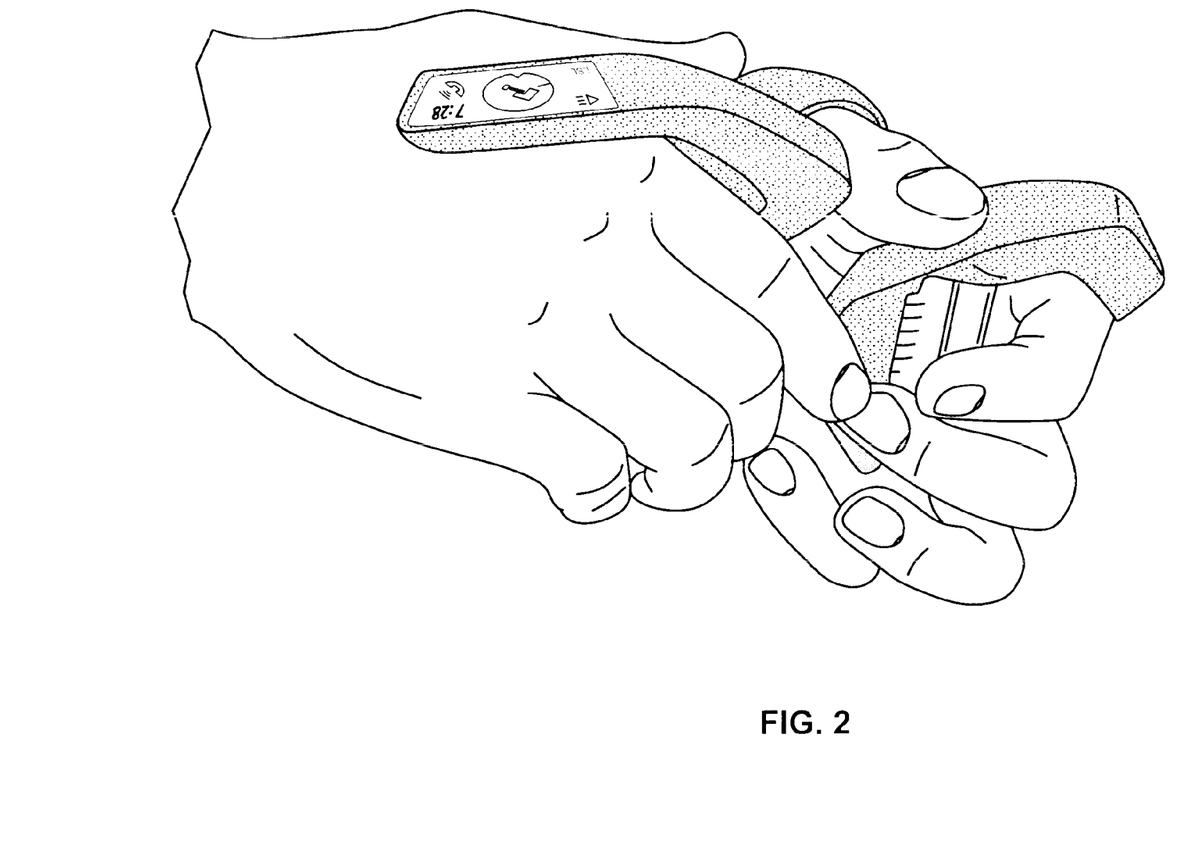
FIG. 2: shows a detail view of two operating units.

FIG. 2 shows a detail view in which a display can be seen on one of the operating units. The display can be configured as a touch screen. It can be used to display information which can relate to the construction machine. Furthermore, it can be used to control functions of the construction machine. The display can be arranged in a portion of the operating unit that rests against the back of the hand, in particular in the region between the thumb and the index finger of the hand.

Figure 3:
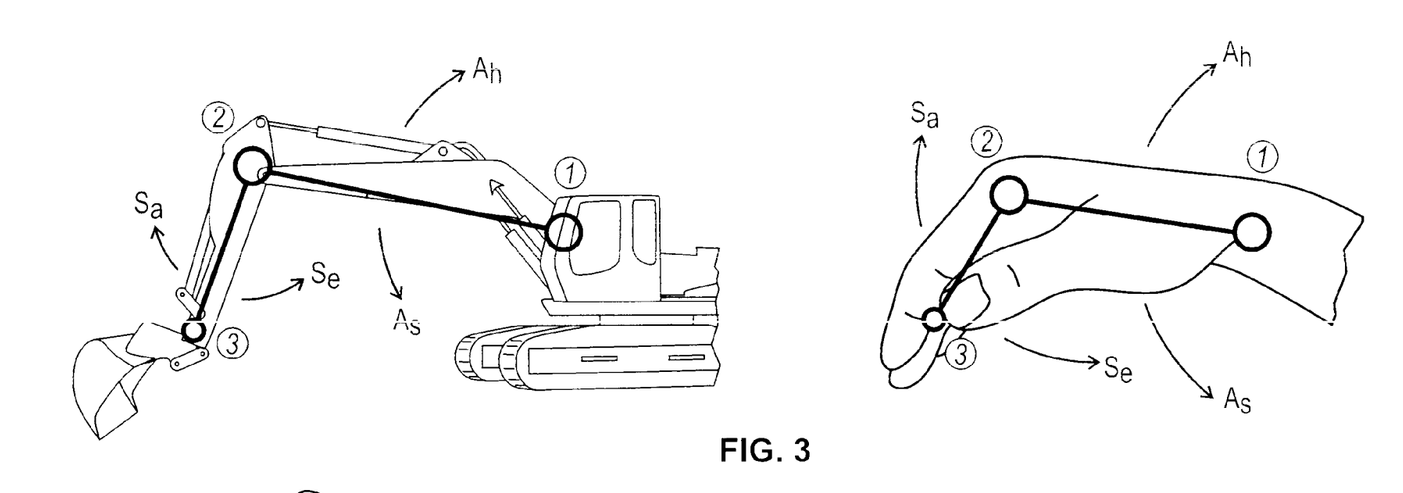
FIG. 3: shows a comparison of a construction machine and a hand of a machine operator with regard to pivot points corresponding to each other.

FIG. 3 shows that for example by means of the right hand of the machine operator the digging operation of the work equipment of the excavator can be reproduced. It is conceivable that this function and also all other functions described here each are carried out with the respective other hand. The wrist corresponds to the pivot point 1 of the boom on the uppercarriage of a construction machine. The knuckle joint or metacarpophalangeal joint corresponds to the pivot point 2 of the dipper arm or another portion of the boom.

When the hand is moved up or down, this movement is converted into control signals for actuating the construction machine. The movements of the excavator boom or other parts of the construction machine effected by means of the control signals can be selected such that there is the greatest possible correspondence or similarity between the movements of the hand and the construction machine.

When the fingers are moved at the knuckle, the finger movement for example can correspond to the movement of the dipper arm of the construction machine.

Figure 4:
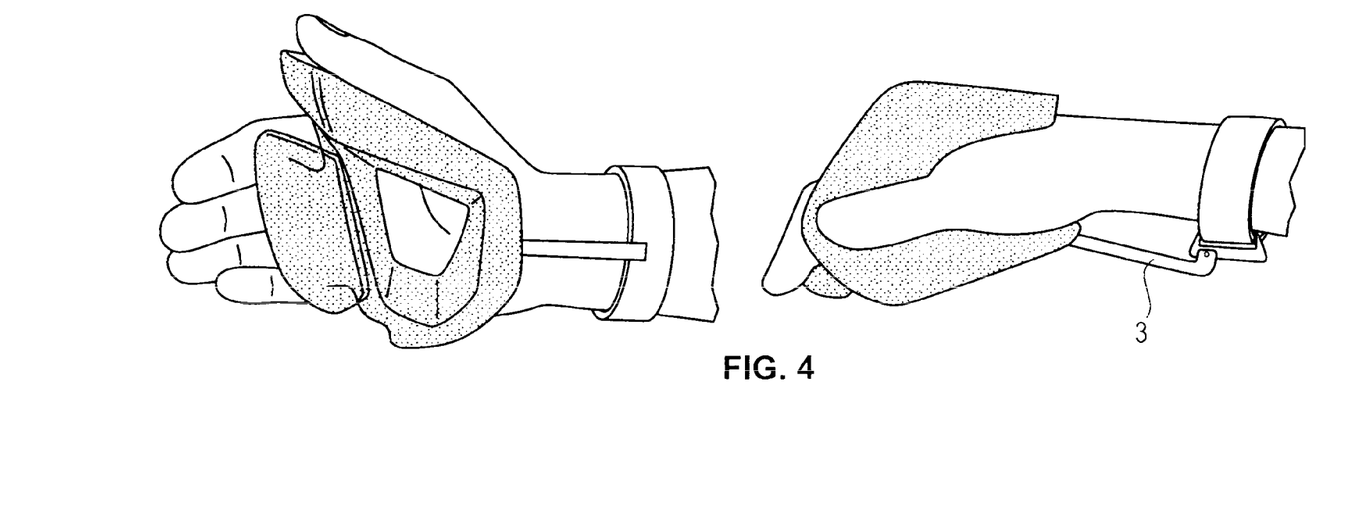
FIG. 4: shows view of an operating unit.

As can be taken from FIG. 4, the operating unit can be fixed on a hand and/or on a forearm. The hand can be inserted between a portion with a display unit and an upper part. The hand movement in the wrist or the position of the wrist can be transmitted via a sliding rod 3.

Figure 5:
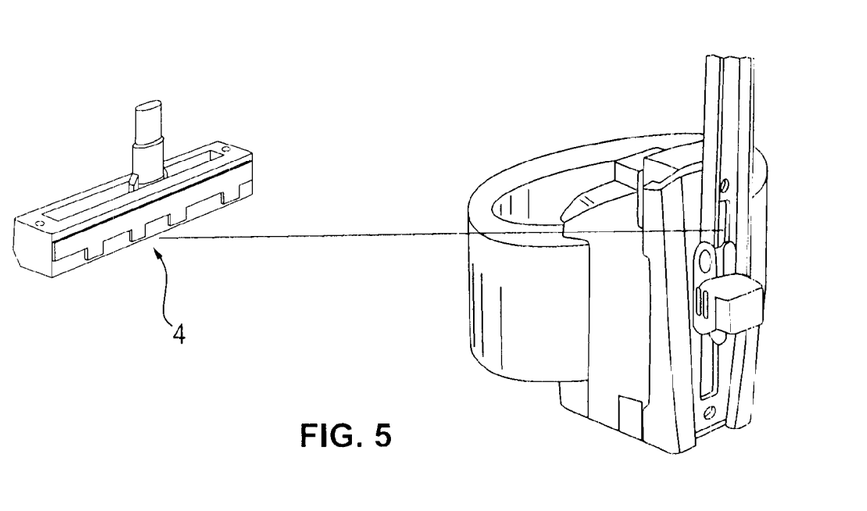
FIGS. 5, 6: show examples of devices for detecting the position of joints of the hand.

FIG. 5 shows a sliding potentiometer 4 which can pick up or detect the path of movement of the hand.

Figure 6:
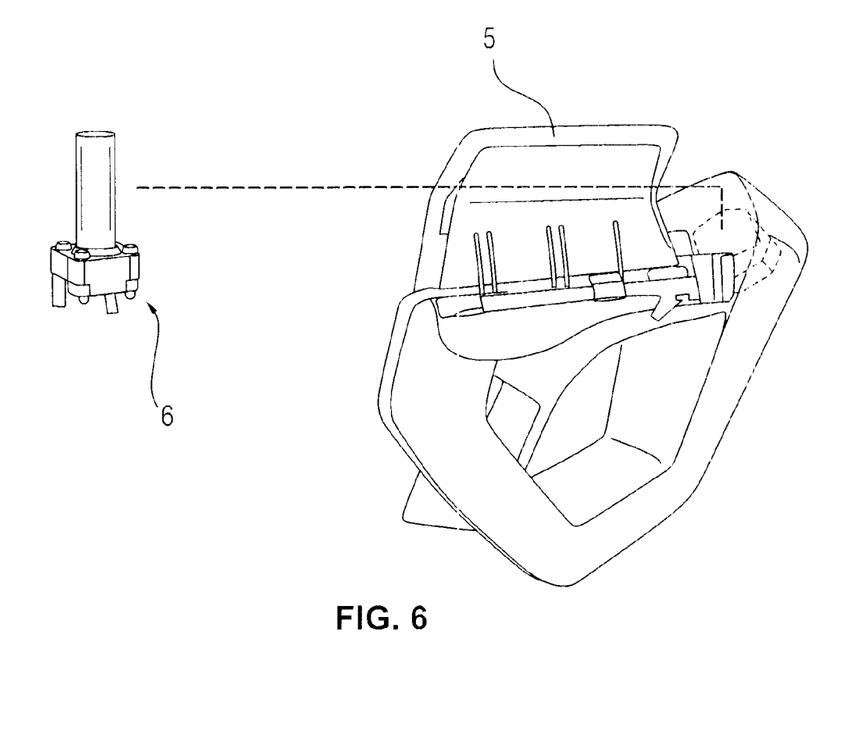

FIG. 6 shows an operating unit on whose upper part a rocker 5 is mounted, which is actuated by the fingers. A rotary potentiometer 6 picks up the path of movement of the fingers and therefrom can generate signals for actuating actuators of the construction machine.

Figure 7:
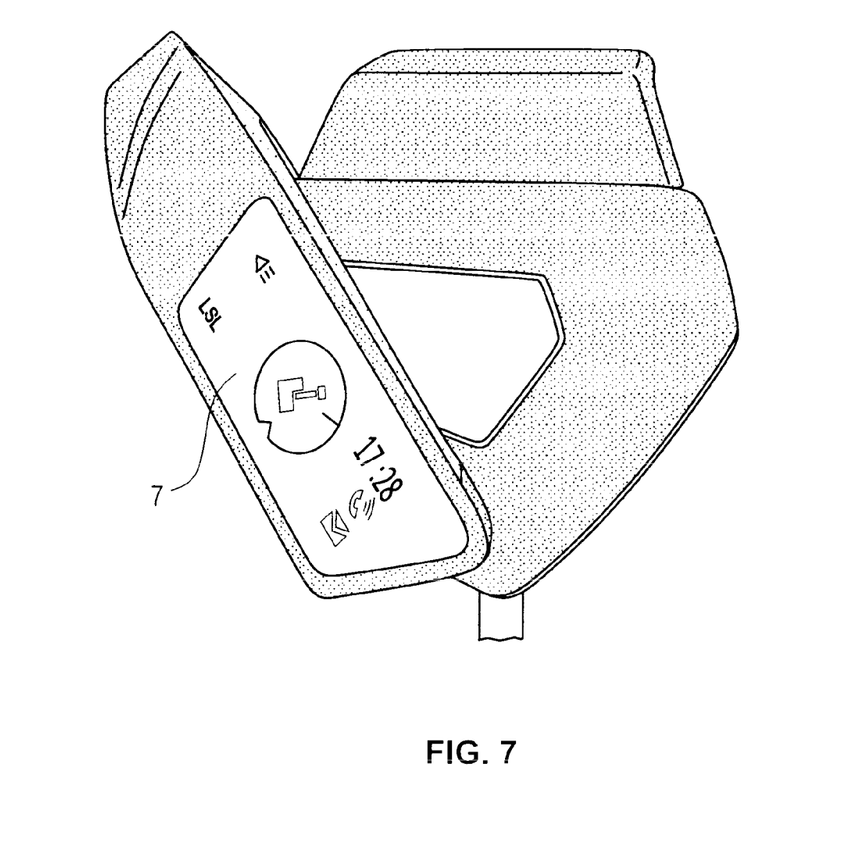
FIG. 7: shows an exemplary configuration of an operating unit with display.

FIG. 7 shows an operating unit on whose upper part a multifunction display 7 with touch screen is mounted. On this display, for example the critical operating conditions of the device, warnings, the current location and/or incoming orders can be displayed.

Figure 8:
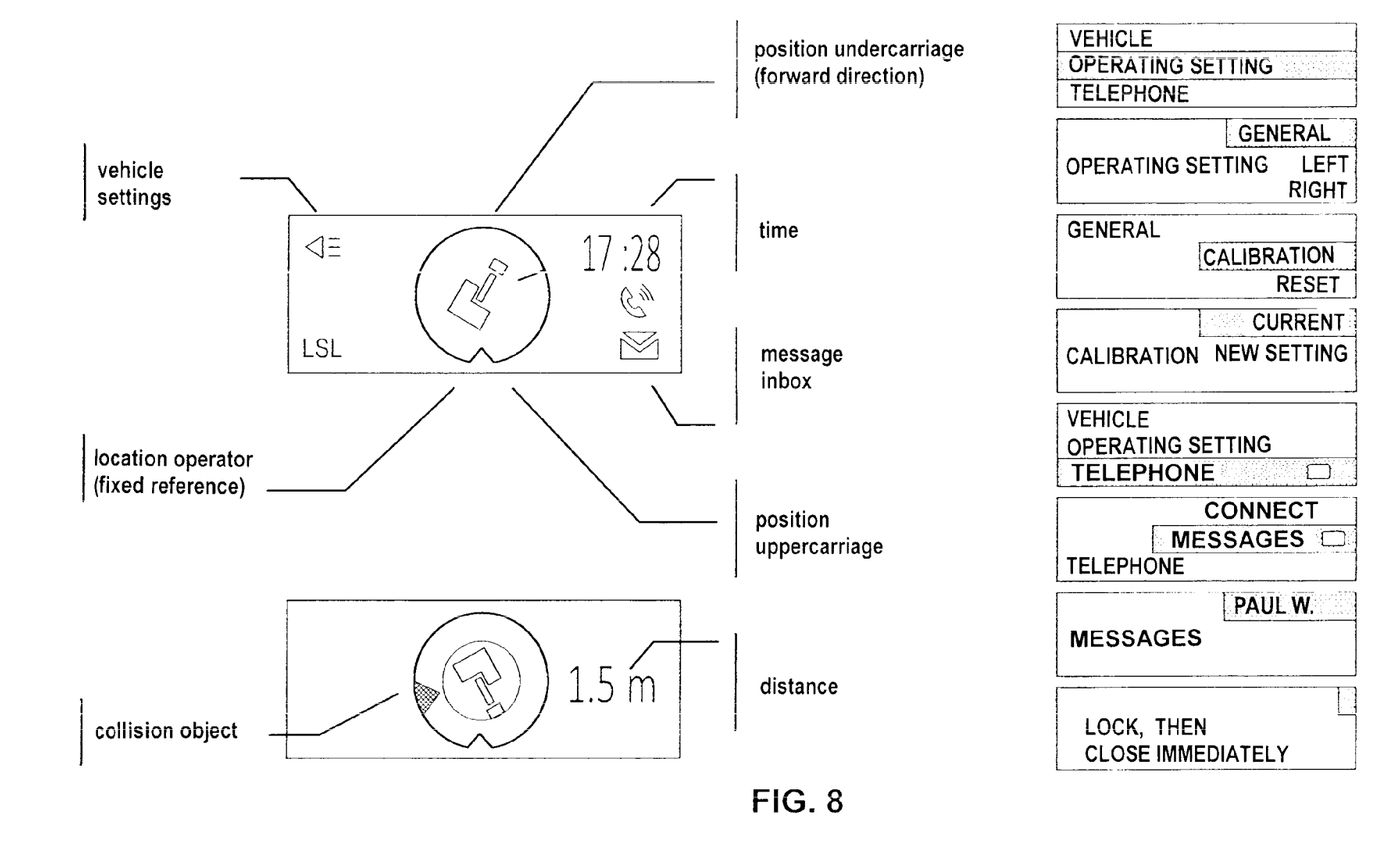
FIG. 8: shows an exemplary design of the display.

A part of the operation of the construction machine can be effected via a touch screen. The interface can have a fixed menu structure, via which different information can be retrieved and functions can be operated. FIG. 8 shows an exemplary configuration of the touch screen.

The operating unit can be connected to the control device of the working machine via a wireless interface. Data can be transmitted to the working machine via a wireless interface.

In one variant, a sliding joint on a hand can alternatively be configured as a rocker. In this variant, a further actuating device can be controlled via the additional joint. What is conceivable is the allocation of a wrist to a boom or swivel arm, of a finger or knuckle joint to an adjusting boom or dipper arm and/or of a finger joint to a dipper arm of the construction machine.

Figure 9:
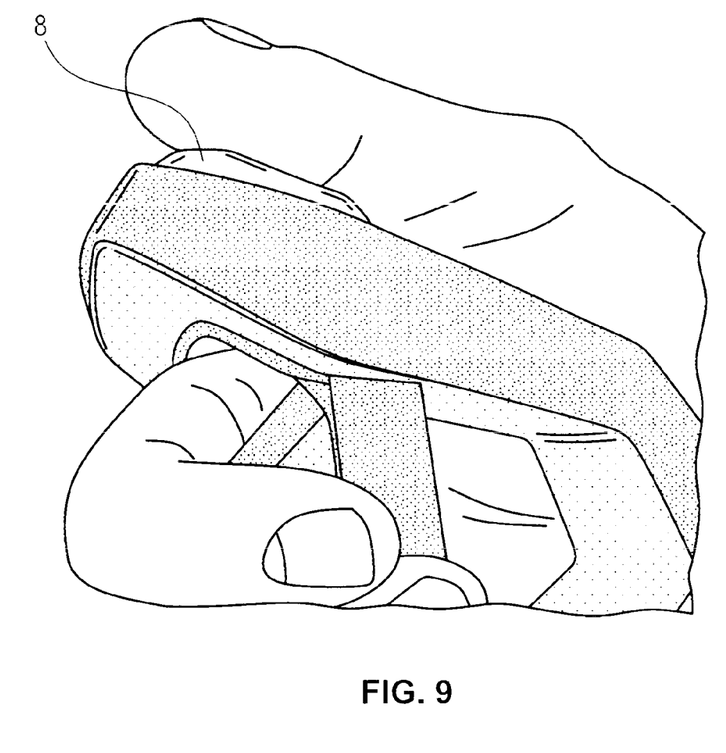
FIG. 9: shows an exemplary configuration of an operating unit.

FIG. 9 shows that the pivoting of an uppercarriage of the construction machine can be controlled via a thumb movement, which for example can be detected via a switch 8 on top of the right-hand operating unit.

Figure 10:
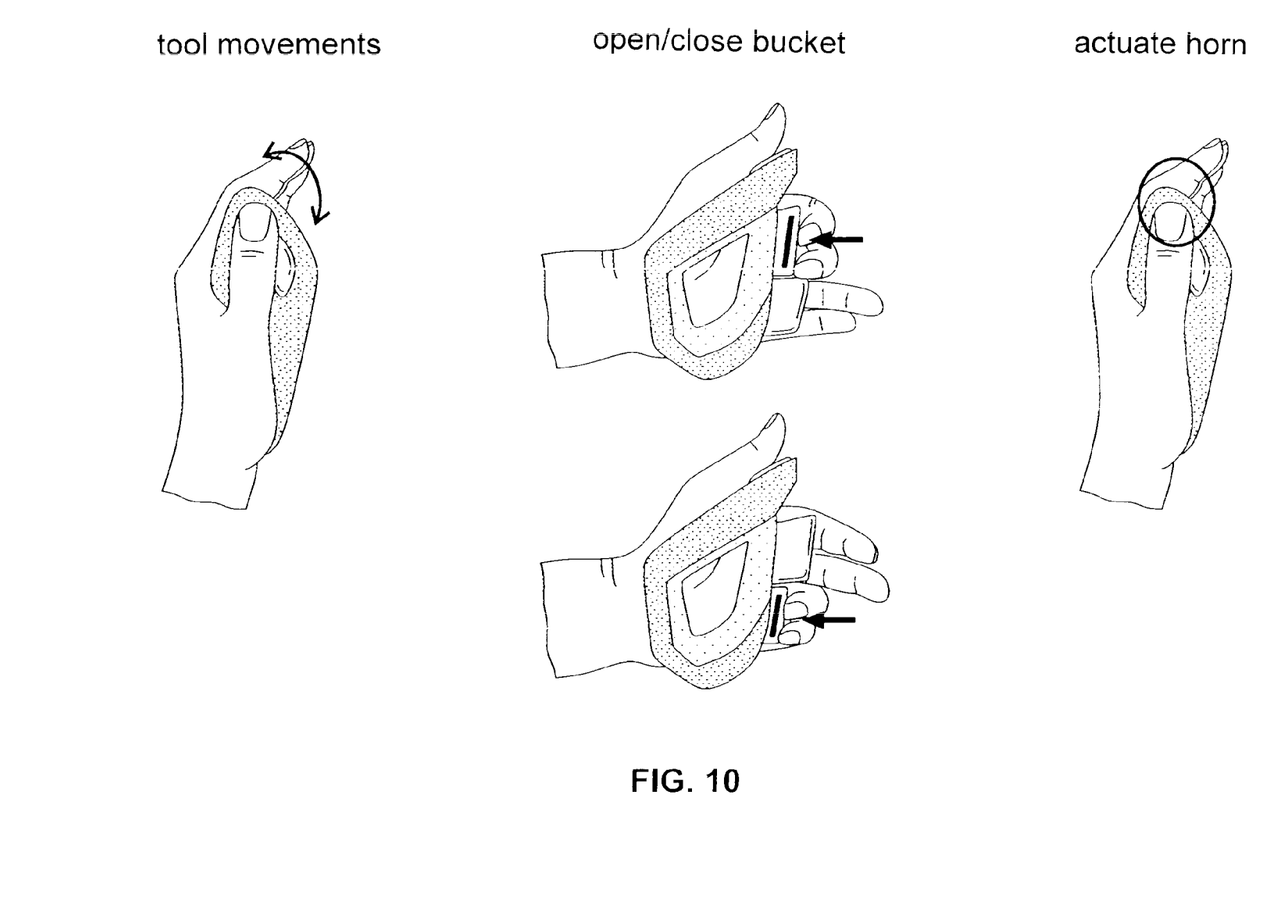
FIG. 10: shows examples for the generation of control signals by means of the operating device.

FIG. 10 by way of example shows functions which can be carried out with one hand. Although there is shown the left hand, the illustrated functions just as well might be carried out with the right hand.

In the left region of FIG. 10 it is shown that by bending for example the wrist, the movements or rotations of the working tool/digging tool of a construction machine can be controlled.

According to the middle part of FIG. 10, the tool movement such as the tipping or dumping of a bucket can be controlled via rockers like the dipper arm movement, wherein here two rockers can be provided. One rocker can be actuated by the index finger and the middle finger and the other rocker by the ring finger and the little finger. According to the right part of FIG. 10, the thumb can be used for example to actuate the horn.

The position of the wrist can be used for actuating the rotation of an attachment tool, the position of a knuckle joint can be used for tipping/dumping a tool, the position of a finger joint can be used for opening/closing an attachment tool and/or the position of the thumb can be used for rotating an attachment tool and/or four issuing a warning signal or for actuating a horn. Of course, even more than one of said joints or body parts possibly can also be taken into account for controlling corresponding functions.

The invention provides for improving the economy of corresponding construction machines already when purchasing the same and during their operation. The invention furthermore provides for also controlling subsequently added working movements or functions of the working machine and the used working tools. By a corresponding software, an inverse control of the involved actuators of the construction machine can become possible. The software can be implemented for example on a control or regulation unit of the construction machine. Furthermore, parameters for scaling the working movements can be transmitted by a corresponding interface. The scaling of the operating device can be adapted to different types of work equipment of the construction machine by a software.

The operating device can be configured to be adapted to the individual body measurements of an operator. For this purpose, adjustable buckles for example can be provided on the operating unit. Individual components, in particular the operating unit or the operating units of the operating device can be configured mirror-symmetrically, so that they can be operated both left-handed and right-handed.

The invention claimed is:

1. The combination of a machine and an operating device which is coupled via an interface to a control device of the working machine,
    the working machine comprising a pivotally-mounted uppercarriage and a boom having individual sections, and
    the operating device being configured to generate control signals for controlling the working machine as a function of an articulated position of a hand of an operator, and comprising at least one operating unit, wherein
    the operating unit is configured to detect position of a wrist and position of metacarpophalangeal joints of the operator and, based on the detected positions, generate a control signal for actuating actuators mounted on the working machine, a first actuator arranged on a first section of the boom to pivot the first section of the boom depending on the position of the wrist relative to the uppercarriage, a second actuator arranged on a second section of the boom to pivot the second section of the boom relative to the first section of the boom depending on the position of at least one metacarpophalangeal joint.

the operating unit is further configured to detect position of at least one proximal interphalangeal joint or one distal interphalangeal joint of the hand of the operator, the boom comprises a third portion and a third actuator mounted thereon, and the third actuator is configured to pivot the third portion of the boom relative to the second portion of the boom depending on the position of the at least one proximal interphalangeal joint or one distal interphalangeal joint, the operating unit is further configured to detect position of two finger proximal interphalangeal joints or distal interphalangeal joints of the hand of the operator, the boom further comprises at least one working tool and a fourth actuator mounted on the working tool, the fourth actuator is configured to displace the working tool depending on the position of the finger proximal interphalangeal joints or distal interphalangeal joints, a fifth actuator is positioned on the pivotally-mounted uppercarriage, a switch (8) positioned on top of the operating unit to be controlled by thumb movement of the operator and pivot the uppercarriage, and the operating unit is configured to be fixed on the hand and/or forearm of the operator, and additionally comprises a sliding rod (3) arranged to transmit movement or position of the wrist of the operator and a sliding potentiometer (4) for detecting path of movement of the hand, a rocker (5) mounted on an upper part of the operating unit to be actuated by fingers of the operator, a rotary potentiometer (6) configured to pick up movement of the fingers and generate signals for activating the actuators, a cuff through which the wrist of the operator is insertable, a part for receiving the hand of the operator, said sliding rod (3) coupling the cuff and part for transmitting position of the wrist, said sliding potentiometer (4) positioned on the sliding rod (3), said rocker (5) and switch (8) mounted on top of the part for receiving the hand of the operator, said rotary potentiometer (6) positioned in the rocker (5), and a multifunction display (7) with a touch screen mounted on top of the part for receiving the hand of the operator.

2. Working machine according to claim 1, wherein the working tool is a digging tool.

3. Working machine according to claim 1, wherein the interface is a wireless interface.

4. Working machine according to claim 1, wherein the working machine is an hydraulic excavator.

* * * * *